June 19, 1956
E. E. CONLEY
2,751,237
HOLLOW FIBER REINFORCED RESIN PRODUCTS SUCH
AS PIPE FITTINGS WITH MOLDED INTERNAL
THREADS AND METHOD OF MAKING SAME
Filed Nov 10, 1952
2 Sheets-Sheet 2
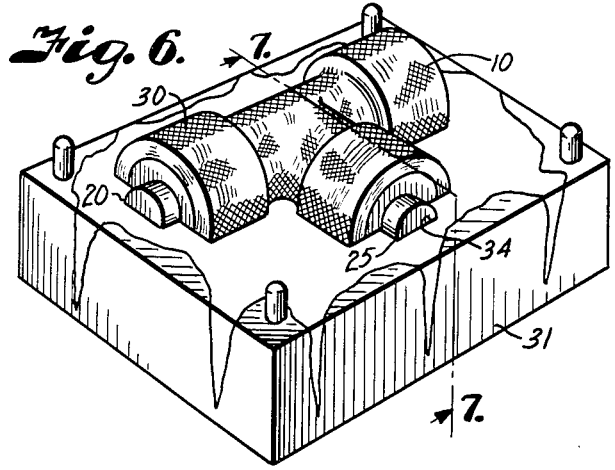
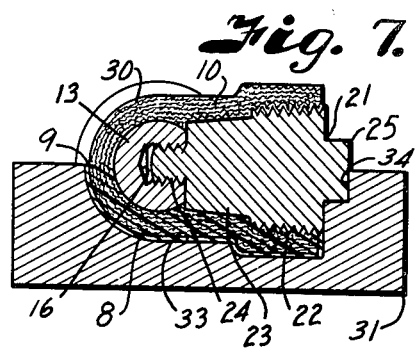
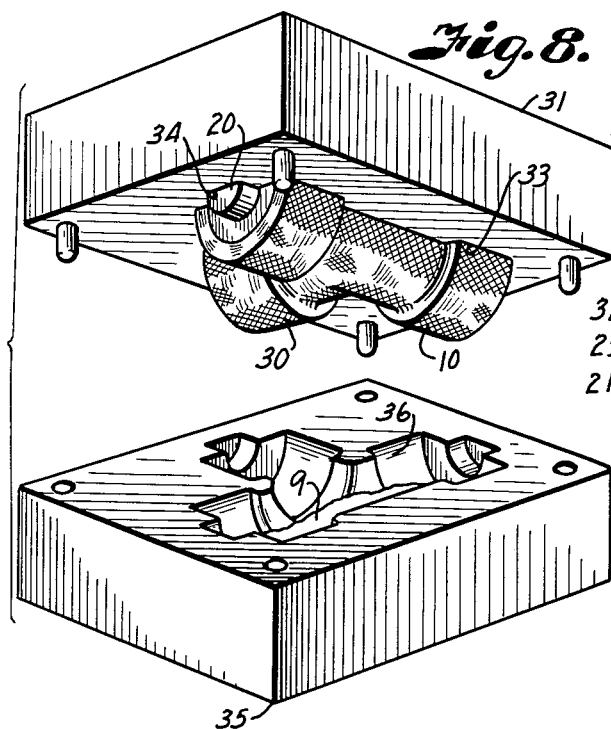
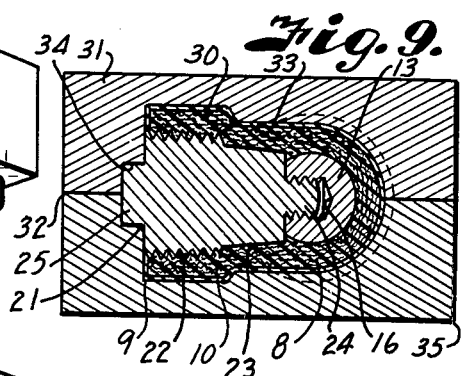
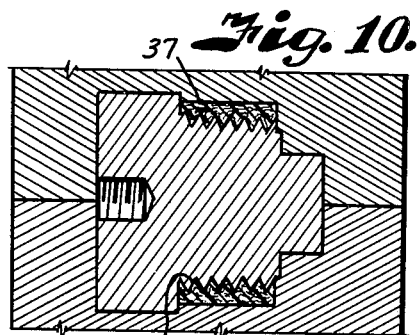
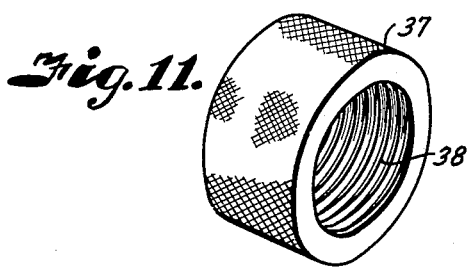
INVENTOR.
Edwin E. Conley.
BY
Fishburn + Mullendore
ATTORNEYS.

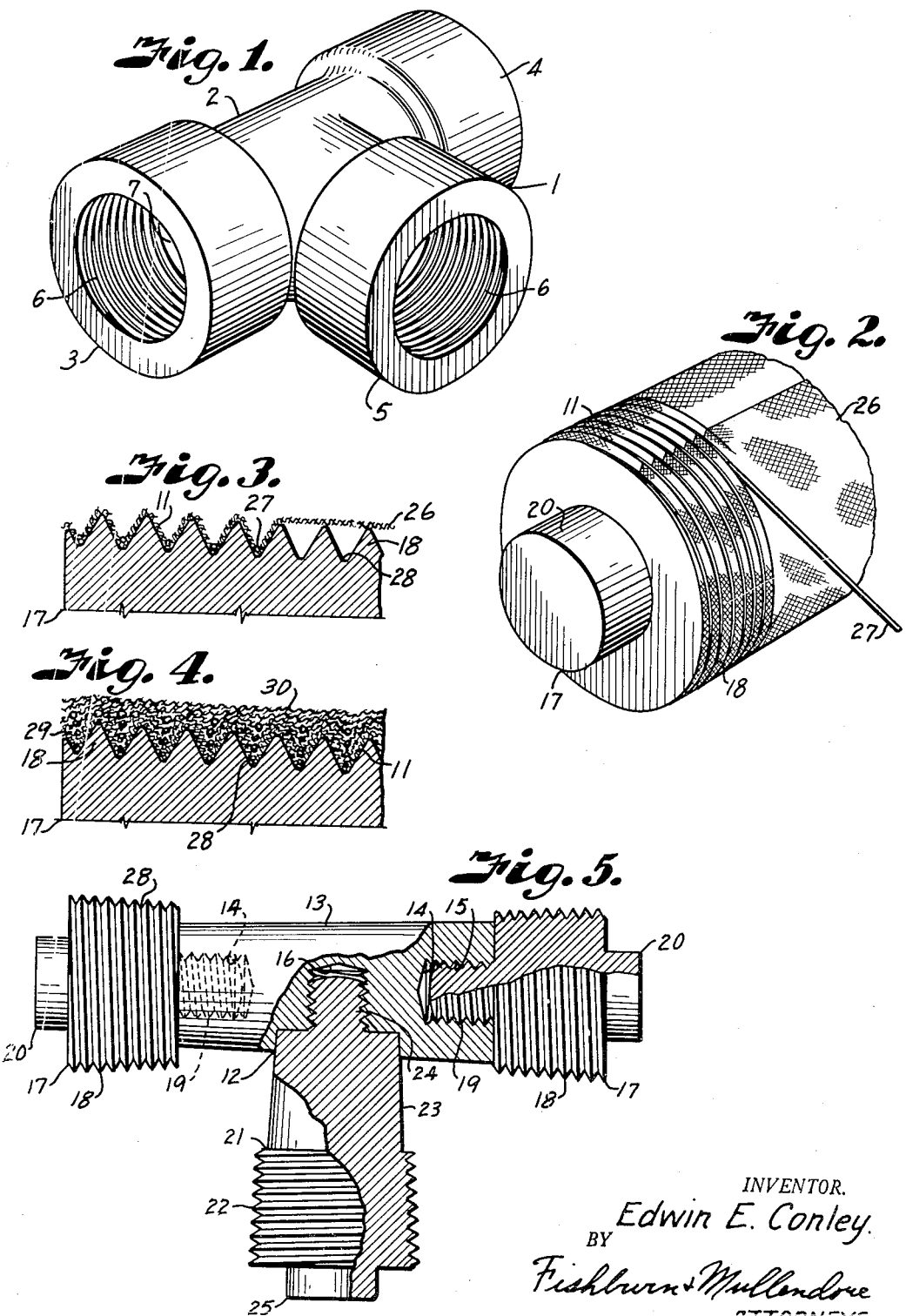

United States Patent Office 2,751,237
Patented June 19, 1956

2,751,237

HOLLOW FIBER REINFORCED RESIN PRODUCTS SUCH AS PIPE FITTINGS WITH MOLDED INTERNAL THREADS AND METHOD OF MAKING SAME

Edwin E. Conley, Tulsa, Okla.

Application November 10, 1952, Serial No. 319,714

10 Claims. (Cl. 285—210)

This invention relates to hollow, fiber reinforced resin products and method of making same, and more particularly to resin pipe fittings reinforced with fibers such as fiber glass and the like and having molded, internal, laminated threads of high strength.

Fiber reinforced resin pipe with molded, external screw threads have been manufactured for some time but attempts to manufacture laminated pipe fittings with internal threads have been unsuccessful. It is not practical to machine a thread into polyester fiber glass laminate because such machining cuts the fibers and weakens the structure to such an extent that in use the threads break down. In such machined threads the portions adjacent the apex of the threads will break off. Difficulty has been experienced in the molding of internal threads in pipe fittings even though the fittings were fiber glass laminates or fiber reinforced because the fibers did not support and strengthen the apex portions of the threads. Difficulty has also been experienced in the molding of cylindrical or like shapes with low pressure laminating resins due to difficulty in obtaining satisfactory distribution of the resins through the mold cavity.

The objects of the present invention are to provide a method of molding hollow, cylindrical and like shapes of fiber reinforced, low pressure, laminating resin with adequate distribution of the resin throughout the product; to provide a method of molding hollow, cylindrical and like shapes wherein a core is wrapped with resin saturated fibers, the wrapped core placed in a cavity in the upper half of a split cavity mold containing a polyester or other suitable liquid thermosetting resin, the resin allowed to gel and then the upper half of the mold inverted with the core therein over the lower half of the split cavity mold having a quantity of the liquid resin in the cavity thereof and the mold halves closed under pressure and the resin allowed to cure; to provide a method of making internally threaded, fiber reinforced resin pipe fittings wherein the fibers are in substantial conformity to the contour of said threads; to provide an internally threaded, fiber reinforced resin pipe fitting wherein fiber fabric substantially conforms to the contour of the threads and fiber strands extend circumferentially of said threads; to provide a method of making fiber reinforced pipe fittings having molded, internal threads wherein the core or the passage through the fitting has separable externally threaded mandrels removably mounted thereon for unscrewing said mandrel from the finished fitting, said method including wrapping resin saturated fiber fabric around the threaded mandrel and applying a strand wrapped around said mandrel to pull the fiber fabric into substantial conformity with the shape of the threads on the mandrel, continued wrapping of the fiber fabric and strans around the threaded portion of the mandrel and wrapping fiber fabric around the core, applying resin to the mold cavity around the wrapped core and curing the resin in the mold; providing a molding process wherein internal threaded fittings of fiber reinforced resin can be produced in one molding process; and to provide an internal threaded fitting and process of making same which is simple, economical and efficient and produces threads in the fitting that are of high strength.

In accomplishing these and other objects of the present invention, I have provided improved details of structure and sequences of method steps, the preferred forms of which are illustrated in the accompanying drawings, wherein:

Fig. 1 is a perspective view of a hollow fiber reinforced resin pipe fitting produced in accordance with my improved method, portions of the fitting being broken away to illustrate the arrangement of the internal threads therein.

Fig. 2 is a perspective view illustrating the application of the fiber fabric and strands to a threaded mandrel.

Fig. 3 is an enlarged sectional view through a portion of the threaded mandrel illustrating the application of the first lamination of fiber fabric and strands thereto.

Fig. 4 is an enlarged sectional view through a portion of the threaded mandrel completely wrapped with fiber fabric and strands.

Fig. 5 is a plan view of a pipe fitting core and threaded mandrels thereon.

Fig. 6 is a perspective view of the wrapped core and mandrels in the upper half of a split cavity mold.

Fig. 7 is a sectional view through the upper half of the mold and fitting core therein taken on the line 7—7, Fig. 6.

Fig. 8 is a perspective view of the split cavity mold with the upper half inverted over the lower half.

Fig. 9 is a sectional view through the split cavity mold in closed condition.

Fig. 10 is a sectional view through a wrapped mandrel in a mold for producing an internally threaded sleeve.

Fig. 11 is a perspective view of a completed internally threaded sleeve.

Referring more in detail to the drawings:

1 designates a fiber reinforced resin pipe fitting which is an example of a hollow, fiber reinforced resin product made by the present method. The pipe fitting illustrated is of the type commonly referred to as a T fitting and consists of a body 2 having ends or branches 3, 4, and 5 provided with molded internal threads 6 for receiving the threaded ends of pipe (not shown). The body 2 is hollow to provide passages 7 communicating with the threaded ends for flow of fluid through the fitting. The passages in the body are defined by walls 8 which are preferably formed of suitable resin 9 reinforced with fibers 10. The fiber reinforcement 10 may be of glass fiber strands, glass colth tape, cotton jute or the like with at least some of the strands extending circumferentially in the walls of the fitting. In the ends of the fitting the inner lamination 11 of fibers conforms substantially to the contour of the threads whereby said threads have high strength, the fibers tending to prevent breaking off portions of the threads adjacent the apex thereof. While a T fitting is illustrated and described, it is to be understood that other hollow products as well as other internal threaded products may be manufactured by my process.

In making a hollow product, for example a pipe fitting, a core 12 of suitable shape to form the passages or hollow portions of the .product and of a suitable number of separable pieces, each being of suitable contour or taper for removal from the product, is utilized. The core 12 for the T fitting preferably consists of a tapered member 13 preferably having a length corresponding to the distance between opposite threaded portions of the fitting, the ends of the portion 13 having threaded recesses 14, the threads 15 of which have leads corresponding to the lead of the threads 6 at the respective ends of the fitting. The core portion 13 also has a threaded recess 16 extending into a side thereof substantially midway of the ends of the portion 13. Externally threaded mandrels 17 having threads 18 corresponding to the threads 6 to be molded in the ends of the fitting are provided with threaded shanks 19 adapted to be screwed into the threaded recesses 14. The ends of the mandrels opposite the shanks 19 are provided with cylindrical extensions 20 to serve as core prints for positioning the core in a mold as later described. A mandrel 21 having external threads 22 has a tapered shank 23 on one end thereof terminating in a threaded shank 24 adapted to be screwed into the threaded recess 16 whereby the shank 23 will form the passage to the lateral branch of the fitting. The threads 22 correspond to the threads 6 to be formed in said lateral branch of the fitting. The mandrel 21 also has a cylindrical extension 25 on the end thereof opposite the tapered shank 23 to serve as a core print for aiding in positioning of the core in the mold. Fiber reinforcing is preferably wrapped on the core to obtain the desired arrangement for the reinforcing in the final product.

In the manufacture of pipe fittings it is preferable that the threaded mandrels 17 and 21 be removed from the core and at least some of the fiber reinforcing applied to the threaded portions thereof. It is preferable to wrap a sheet of liquid resin saturated glass fiber cloth 26 around the threaded portion of the mandrel and then by use of a strand of glass fibers, cotton, plastic or the like 27 and winding same around the cloth wrapped threaded portion, under tension, the resin saturated glass fiber cloth is pulled into the thread groove or roots 28 of the threads on the mandrel. When the cloth is pulled into the thread grooves said cloth will substantially assume the same contour as the surfaces of the threads. It is, therefore, preferable that the sheet 26 be wider than the total length of the threaded portion and that one side of the sheet be arranged adjacent one end of the threaded portion whereby when the sheet 26 is pulled into the thread grooves 28 the other side will be adjacent the other end of the threaded portion. A second sheet 29 of resin saturated glass fiber cloth is then wrapped around the mandrel and in turn is pulled into the thread recesses by winding a strand of suitable material thereon under tension. This application of the glass fiber cloth and strands is continued until a desired thickness of wrappings is on the threaded portion of the mandrel as shown in Fig. 4.

The wrapped mandrels 17 and 21 are then connected to the core portion 13 by secrewing the threaded shanks 19 and 24 into the threaded recesses 14 and 16 respectively. Then the entire core is wrapped or wound with resin saturated glass fiber strands, glass cloth tape, cotton, jute or the like 30 to build up the fiber reinforcing material thereon as illustrated in Fig. 6 until the outside dimensions of the wrapped core approximate the outside dimensions desired in the finished molded product. The upper half 31 of a split cavity mold 32 is then inverted and a liquid thermosetting plastic resin applied to the cavity 33 therein. The cavity 33 has a contour corresponding to the desired outer contour of the upper half of the finished product and also has cavity portions 34 coresponding to the core prints on the core. The wrapped core is then pressed into the cavity 33 until the core prints 20 and 25 seat in the respective core print cavity portions 34. Any trapped air in the resin rises to the surface thereof as the wet wrapped core sinks into the mold cavity and seats itself properly in the core print recesses. The quantity of resin applied to the upper half of the mold should be sufficient that there will be a slight resin spill over occurring due to the displacement by the wrapped core. This spill over aids in carrying air bubbles to the surface and the overflow occurs at the parting or flash line of the mold.

The liquid thermosetting plastic resin in the upper half of the mold is then allowed to set to a sticky condition which will hold the wrapped core and resin in the upper half of the split cavity mold. The upper half of the mold is then fastened to upper platens of a suitable low pressure hydraulic or mandrel press and with the lower half 35 of the split cavity mold 32 in position under the upper half a suitable quantity of the liquid thermosetting plastic resin is applied to the cavity 36 in said lower mold half 35. The mold halves are then brought together to seat the wrapped core in the cavity of the lower half of the split cavity mold, the quantity of resin being sufficient to cause a slight amount of squeeze out or flash as the mold halves are brought together. Heat is then applied to the molds to cure the resin therein to a solid condition. The molded product is then removed from the mold and the threaded mandrels 17 and 21 removed by unscrewing the threaded shanks 19 and 24 from the threaded recesses 14 and 16 respectively, and due to the lead of said threaded shanks being the same as the threads formed in the molded product the mandrels will be unscrewed from the fitting. The tapered core portion 13 is then pulled from the molded product and any flash on said product is removed in a conventional manner.

If desired threaded mandrels may be wrapped with fiber reinforcement as illustrated in Figs. 2, 3 and 4 and said mandrels placed in a mold as illustrated in Fig. 10 with a suitable amount of resin and cured to form a sleeve 37 having molded internal threads 38. Pipe fittings may be manufactured whereby the body of the fitting is molded as described or by other suitable process with recesses in the ends thereof for receiving the sleeves 37 and the sleeves with the internal threads may then be cemented or otherwise suitably secured in the recesses in the ends of the pipe fitting body. Molded products not having internal threads may be manufactured by wrapping resin saturated fibers or fiber cloth and the like on a core and then applying the wrapped core to a split cavity mold as described.

In the making of hollow, fiber reinforced resin products any low pressure, laminating, thermosetting resin may be used. Polyester resins, for example allyl, alkyd, epoxy or furan have been found to be very satisfactory. Also combinations of resins can be used. It is desirable that the fiber cloth be saturated with a catylized liquid thermosetting plastic resin as is applied to the mold cavities to form the outside surface of the final finished product. However, the resins may be of different viscosity if desired.

It is believed obvious that I have provided a manufacturing process for hollow, fiber reinforced resin products that is economical and efficient and a method of making fiber reinforced pipe fittings with internal, laminated threads of high strength which reduce the danger of weak and broken threads which have been present in plastic pipe fittings prior to this time.

What I claim and desire to secure by Letters Patent is:

1. The method of molding hollow fiber reinforced resin products which comprises, wrapping a core of the shape of the cavity in the product to be produced with resin saturated fibers to pull the fibers into substantial conformity with the shape of the core, continuing the wrapping of the resin saturated fibers on the core to substantially the thickness of the desired product walls, applying a quantity of liquid thermosetting resin to one-half of a split cavity mold, pressing the wrapped core into said half of the split cavity mold, retaining the wrapped core in said mold half until the resin therein gels, applying a quantity of said resin to the other half of the split cavity mold, inverting said first one-half of the mold and core therein over said other mold half and moving the two mold halves together under pressure, applying heat to the mold to cure the resin, separating the mold halves to remove the molded product, and removing the core from the molded product.

2. The method of molding hollow fiber reinforced resin products which comprises, wrapping a core of the shape of the cavity in the product to be produced with liquid thermosetting resin saturated fiber fabric to pull the fiber fabric into substantial conformity with the shape of the core, continuing the wrapping of the resin saturated fiber fabric on the core to substantially the thickness of the desired product walls, applying a quantity of liquid low pressure thermosetting resin to one-half of a split cavity mold, pressing the wrapped core into said half of the split cavity mold, the quantity of resin therein being sufficient to spill over the mold, retaining the wrapped core in said mold half until the resin therein gels, applying a quantity of said resin to the other half of the split cavity mold, inverting said first one-half of the mold and core therein over said other mold half and moving the two mold halves together under pressure, applying heat to the mold to cure the resin, separating the mold halves to remove the molded product, and removing the core from the molded product.

3. The method of molding hollow fiber reinforced resin products which comprises, saturating a fiber fabric with liquid thermosetting resin, wrapping a core of the shape of the cavity in the product to be produced with the resin saturated fiber fabric, winding a strand around the wrapped core to pull the fiber fabric into substantial conformity with the shape of the core, continuing the wrapping of the resin saturated fiber fabric and winding of the strands to substantially the thickness of the desired product wall, applying a quantity of liquid low pressure thermosetting resin to one-half of a split cavity mold, pressing the wrapped core into said half of the split cavity mold, the quantity of resin therein being sufficient to spill over the mold, retaining the wrapped core in said mold half until the resin therein gels, applying a quantity of said resin to the other half of the split cavity mold, inverting said first one-half of the mold and core therein over said other mold half and moving the two mold halves together under pressure, applying heat to the mold to cure the resin, separating the mold halves to remove the molded product, and removing the core from the molded product.

4. The method of making internally threaded fiber reinforced resin pipe fittings which comprises, wrapping a resin saturated fiber fabric circumferentially of externally threaded mandrels for each fitting outlet under tension to pull the fiber fabric into the thread grooves and in substantial conformity to the contour of said threads of each mandrel, continuing the wrapping of the resin saturated fiber fabric on the mandrels to a desired thickness, securing each of the wrapped mandrels to a core of the shape of the cavity in the fitting to be produced, wrapping the mandrels and core with resin saturated fibers, continuing the wrapping of the fibers to substantially the thickness of the desired fitting wall, applying a quantity of liquid low pressure thermosetting resin to one-half of a split cavity mold, pressing the wrapped mandrels and core into said half of the split cavity mold, retaining the wrapped core and mandrels thereon in said mold half until the resin therein gels, applying a quantity of said resin to the other half of a split cavity mold, inverting said first one-half of the mold and core with mandrels thereon over said other mold half and moving the two mold halves together under pressure, applying heat to the mold to cure the resin, separating the mold halves to remove the molded fitting therefrom, and removing the mandrel and core from the molded fitting.

5. The method of making internally threaded fiber reinforced resin pipe fittings which comprises, wrapping a resin saturated fiber fabric circumferentially of externally threaded mandrels for each fitting outlet under tension to pull the fiber fabric into the thread grooves and in substantial conformity to the contour of said threads of each mandrel, continuing the wrapping of the resin saturated fiber fabric and winding of the strands on the mandrels to a desired thickness, securing each of the wrapped mandrels to a core of the shape of the cavity in the fitting to be produced, wrapping the mandrels and core with resin saturated fiber fabric, continuing the wrapping of the fiber fabric to substantially the thickness of the desired fitting wall, applying a quantity of liquid low pressure thermosetting resin to one-half of a split cavity mold, pressing the wrapped mandrels and core into said half of the split cavity mold, the quantity of resin therein being sufficient to spill over the mold, retaining the wrapped core and mandrels thereon in said mold half until the resin therein gels, applying a quantity of said resin to the other half of a split cavity mold, inverting said first one-half of the mold and core with mandrels thereon over said other mold half and moving the two mold halves together under pressure, applying heat to the mold to cure the resin, separating the mold halves to remove the molded fitting therefrom, disconnecting the mandrels from the core and unscrewing the mandrels from the molded resin to remove said mandrels, and removing the core from the molded fitting.

6. The method of making internally threaded fiber reinforced resin pipe fittings which comprises, wrapping a resin saturated fiber fabric circumferentially of externally threaded mandrels for each fitting outlet, winding a strand around the wrapping to pull the fiber fabric into the thread grooves and in substantial conformity to the contour of said threads of each mandrel, continuing the wrapping of the resin saturated fiber fabric and winding of the strands on the mandrels to a desired thickness, securing each of the wrapped mandrels to a core of the shape of the cavity in the fitting to be produced, wrapping the mandrels and core with resin saturated fiber fabric, winding a strand around the wrapped mandrels and core to pull the fiber fabric into substantial conformity with the shape of the mandrels and core, continuing the wrapping of the fiber fabric and winding of the strands to substantially the thickness of the desired fitting wall, applying a quantity of liquid low pressure thermosetting resin to one-half of a split cavity mold, pressing the wrapped mandrels and core into said half of the split cavity mold, the quantity of resin therein being sufficient to spill over the mold, retaining the wrapped core and mandrels thereon in said mold half until the resin therein gels, applying a quantity of said resin to the other half of a split cavity mold, inverting said first one-half of the mold and core with mandrels thereon over said other mold half and moving the two mold halves together under pressure, applying heat to the mold to cure the resin, separating the mold halves to remove the molded fitting therefrom, disconnecting the mandrels from the core and unscrewing the mandrels from the molded resin to remove said mandrels, and removing the core from the molded fitting.

7. The method of making internally threaded hollow glass fiber reinforced resin pipe fittings which comprises, wrapping a resin saturated glass fiber fabric in tension circumferentially of a core and a removable externally threaded mandrel thereon of a shape of the cavity in the product to be produced, winding a fibrous strand under tension around the glass fiber fabric wrapping on the mandrel substantially circumferentially of the mandrel and in alignment with the thread grooves to pull the glass fiber fabric into the thread grooves and in substantial conformity to the contour of said threads, continuing the wrapping of the glass fiber fabric and winding of the fibrous strands thereon to substantially the wall thickness of the desired product, inserting the wrapped core and mandrel in a mold cavity, retaining the wrapped core and mandrel in said mold cavity, applying heat to the mold to cure the resin, removing the cured glass fiber reinforced resin pipe fitting from the mold, and unscrewing the mandrel from the cured glass fiber reinforced resin pipe fitting to remove said mandrel therefrom.

8. The method of making internally threaded hollow glass fiber reinforced resin pipe fittings which comprises, wrapping a resin saturated glass fiber fabric in tension circumferentially of a core and a removable externally threaded mandrel thereon of a shape of the cavity in the product to be produced, winding a fibrous strand under tension around the glass fiber fabric wrapping on the mandrel substantially circumferentially of the mandrel and in alignment with the thread grooves to pull the glass fiber fabric into the thread grooves and in substantial conformity to the contour of said threads, continuing alternate wrapping of the glass fiber fabric and winding of the fibrous strands thereon to substantially the wall thickness of the desired product, inserting the wrapped core and mandrel and additional thermosetting liquid resin in a mold cavity, retaining the wrapped core and mandrel in said mold cavity until the resin therein gels, applying heat to the mold to cure the resin, removing the cured glass fiber reinforced resin pipe fitting from the mold, and unscrewing the mandrel from the cured glass fiber reinforced resin pipe fitting to remove said mandrel therefrom.

9. A molded glass fiber reinforced resin internally threaded pipe fitting comprising, a hollow body of molded thermosetting liquid resin having a plurality of laminations of glass fiber fabric in the walls of the body and extending circumferentially therein, branches on said body having molded internal screw threads in the ends thereof, a plurality of laminations of glass fiber fabric in the walls of the branches and extending circumferentially thereof under tension, the inner lamination of glass fiber fabric in the branches conforming substantially to the contour of the internal threads, and a fibrous strand having relatively high tensile strength extending circumferentially of each branch in alignment with the threads therein and in engagement with the outer surface of the portions of the inner lamination of the glass fiber fabric in the apex of the threads, said fibrous strand being in tension.

10. A molded glass fiber reinforced resin internally threaded pipe fitting comprising, a hollow body of molded thermosetting liquid resin having a plurality of laminations of glass fiber fabric in the walls of the body and extending circumferentially therein, branches on said body having molded internal screw threads in the ends thereof, a plurality of laminations of glass fiber fabric in the walls of the branches and extending circumferentially thereof under tension, the inner lamination of glass fiber fabric in the branches conforming substantially to the contour of the internal threads, a fibrous strand having relatively high tensile strength extending circumferentially of each branch in alignment with the threads therein and substantially engaging the outer surface of the portions of the inner lamination of the glass fiber fabric in the apex of the threads, said fibrous strand being in tension, and fibrous strands under tension extending circumferentially of each branch intermediate the other laminations of glass fiber fabric in said branches.

References Cited in the file of this patent

UNITED STATES PATENTS

| | | |
|---|---|---|
| 1,370,024 | Kempton | Mar. 1, 1921 |
| 1,932,809 | Wheeler | Oct. 31, 1933 |
| 2,003,232 | Benge | May 28, 1935 |
| 2,025,830 | Rosmait | Dec. 31, 1935 |
| 2,256,386 | Farrar et al. | Sept. 16, 1941 |
| 2,594,693 | Smith | Apr. 29, 1952 |
| 2,640,501 | Scott et al. | June 2, 1953 |